(12) United States Patent
Kuo et al.

(10) Patent No.: US 7,854,308 B2
(45) Date of Patent: Dec. 21, 2010

(54) FLIPPING APPARATUS

(75) Inventors: Pei-Chin Kuo, Taipei Hsien (TW);
Juey-Fong Chang, Taipei Hsien (TW);
Wen-Tao Wang, Shenzhen (CN);
Zhi-Gang Hu, Shenzhen (CN);
Xue-Shun Xing, Shenzhen (CN);
Jin-Wen Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 197 days.

(21) Appl. No.: 12/211,051

(22) Filed: Sep. 15, 2008

(65) Prior Publication Data

US 2009/0196727 A1    Aug. 6, 2009

(30) Foreign Application Priority Data

Feb. 1, 2008    (CN)    ......................... 2008 1 0300317

(51) Int. Cl.
*B65G 47/24* (2006.01)

(52) U.S. Cl. ......................................... 193/47; 198/406

(58) Field of Classification Search ................... 193/44, 193/47; 198/406; 414/758, 760, 768, 770, 414/773, 781

See application file for complete search history.

(56) References Cited

U.S. PATENT DOCUMENTS

| | | | | | |
|---|---|---|---|---|---|
| 2,514,348 | A | * | 7/1950 | Meinerding | 414/680 |
| 2,572,942 | A | * | 10/1951 | Malsbary | 193/47 |
| 2,776,034 | A | * | 1/1957 | Jordt | 193/47 |
| 2,981,394 | A | * | 4/1961 | Stecher | 193/47 |
| 4,494,900 | A | * | 1/1985 | Johnson et al. | 193/47 |
| 5,159,797 | A | * | 11/1992 | Herzog | 193/47 |
| 5,630,496 | A | * | 5/1997 | Mims | 198/406 |

* cited by examiner

*Primary Examiner*—James R Bidwell
(74) *Attorney, Agent, or Firm*—Zhigang Ma

(57) ABSTRACT

An exemplary flipping apparatus includes a slider, a flipping member and a holding table. The slider is slanted relative to the horizon. A first end of the flipping member is connected to the slider. The flipping member includes a first flipping plate and a second flipping plate facing the first flipping plate. The first flipping plate and the second flipping plate are contoured to define a workplace groove to receive a workpiece to be flipped. An angle defined by the slider and an end section of the first flipping plate opposite to the slider is less than an angle between the slider and the horizon. The holding table is connected to a second end of the flipping member, and the second end is opposite to that of the first end of the flipping member.

9 Claims, 7 Drawing Sheets

FLIPPING APPARATUS

BACKGROUND

1. Technical Field

The present disclosure generally relates to flipping apparatuses, and more particularly to an automatic flipping apparatus.

2. Discussion of the Related Art

Work pieces generally need to be flipped (turned over) in an assembly line. Two manners are often used to flip work pieces: manually flipping a work piece and flipping a work piece using a flipping apparatus. However, since using manual labor is expensive and inefficient, flipping apparatuses are more commonly used.

Referring to FIG. 7, one such flipping apparatus 10 includes a support 11, a flipping table 12, a mover 13, and a worktable 14. The worktable 14 is disposed under the flipping table 12. The support 11 is mounted on the flipping table 12. The support 11 includes a plurality of columns 112 and a lift 114 slidably mounted on the columns 112. A rotator 116 and the flipping table 12 are mounted on the lift 114. The rotator 116 is configured for forcing the flipping table 12 to rotate. The mover 13 includes a telescopic slider 132 mounted on the support 11, a connecting member 134 connected to an end of the slider 132, and an attracting member 136 disposed under the connecting member 134.

To flip a work piece 20, the slider 132 extends to bring the mover 13 to a side of the support 11. The absorbing member 136 attracts the work piece 20 and the slider 132 contracts to bring the mover 13 directly over the flipping table 12. The work piece 20 is released by the absorbing member 136 and the slider 132 extends to remove the absorbing member 136 away from the flipping table 12. The work piece 20 is fixed on the flipping table 12 by a vacuum absorber consequently. Then the rotator 116 forces the flipping table 12 and the work piece 20 to rotate an angle of 180 degrees. After that, the lift 114 brings the flipping table 12 together with the work piece 20 downwards and places the work piece 20 on the worktable 14.

However, the flipping apparatus 10 comprises many components. Additionally, the vacuum absorber is required to be used in the flipping apparatus 10 to hold the work piece 20. Thus, the flipping apparatus 10 is inexpensive and a reliability of the flipping apparatus 10 is reduced because of the many components.

Therefore, a new flipping apparatus is desired in order to overcome the above-described shortcomings.

SUMMARY

An exemplary flipping apparatus includes a slider, a flipping member and a holding table. The slider is slanted relative to the horizon. A first end of the flipping member is connected to the slider. The flipping member includes a first flipping plate and a second flipping plate facing the first flipping plate. The first flipping plate and the second flipping plate are contoured to define a workplace groove to receive a workpiece to be flipped. An angle defined by the slider and an end section of the first flipping plate opposite to the slider is less than an angle between the slider and the horizon. The holding table is connected to a second end of the flipping member, and the second end is opposite to that of the first end of the flipping member.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present flipping apparatus. Moreover, in the drawings, like reference numerals designate corresponding parts throughout several views, and all the views are schematic.

DETAILED DESCRIPTION

Reference will now be made to the drawings to describe certain inventive embodiments of the present flipping apparatus in detail.

Figure 1:
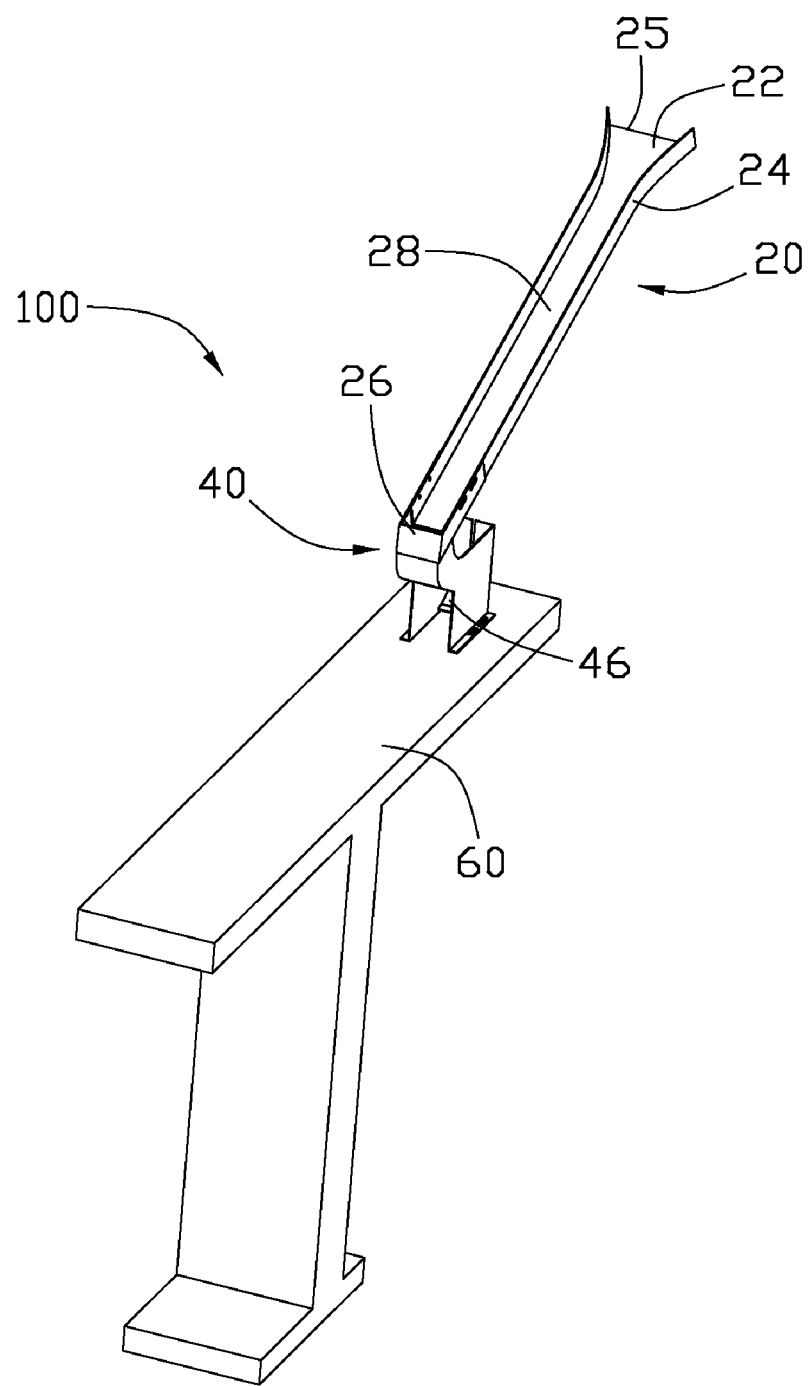
FIG. 1 is an assembled, isometric view of a flipping apparatus in accordance with an exemplary embodiment of the present application.
Figure 3:
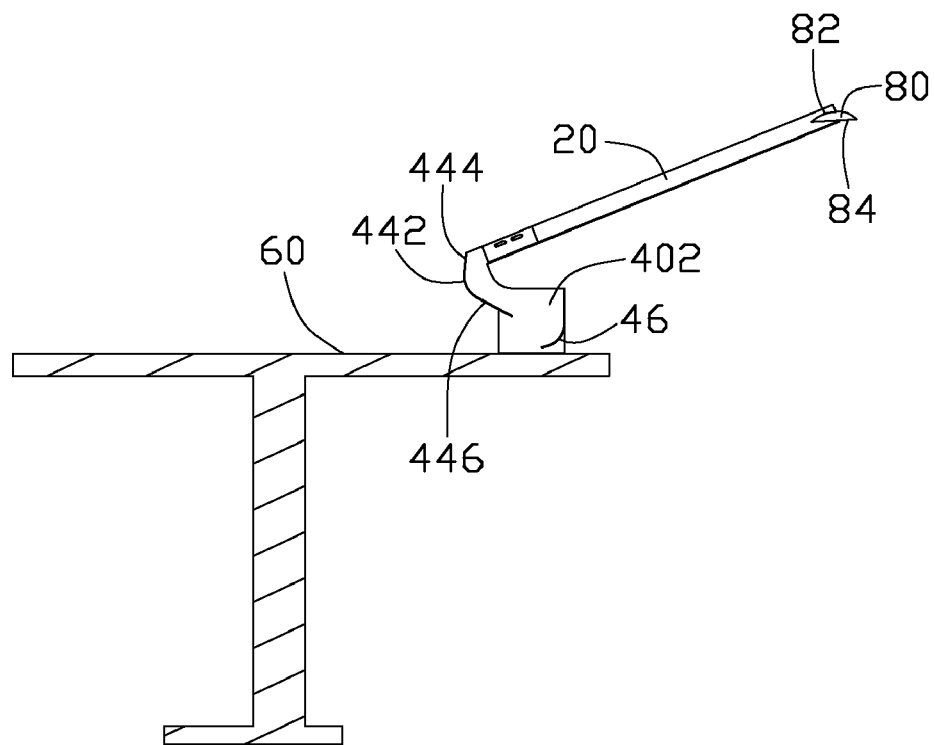
FIG. 3 is a cross-sectional view showing a work piece at a first position of the flipping apparatus of FIG. 1.

Referring to FIG. 1, a flipping apparatus 100 of the present disclosure is used to flip (overturn) a work piece 80, for example a housing of a mobile phone, (shown in FIG. 3). The flipping apparatus 100 includes a slider 20, a flipping member 40, and a holding table 60. The slider 20 and the holding table 60 are connected to opposite ends of the flipping member 40. The work piece 80 has a top surface 82 and a bottom surface 84 opposite to the top surface 82.

The slider 20 includes a main plate 22 and two side rails 24 formed at opposite sides of the main plate 22. The slider 20 defines an entrance end 25 and an exit end 26 opposite to the entrance end 25. The main plate 22 and the side plates 24 cooperatively define a sliding channel 28. A width of the sliding channel 28 at the entrance end 25 is larger than the width of other sections of the sliding channel 28 to easily place the work pieces 80 into the sliding channel 28, thus forming a Y-shaped open at the entrance end 25. The sliding channel 28 is slanted relative to the horizon. The slider 20 is configured for accelerating the work piece 80 such that the work piece 80 slides into the flipping member 40 with a certain speed.

Figure 2:
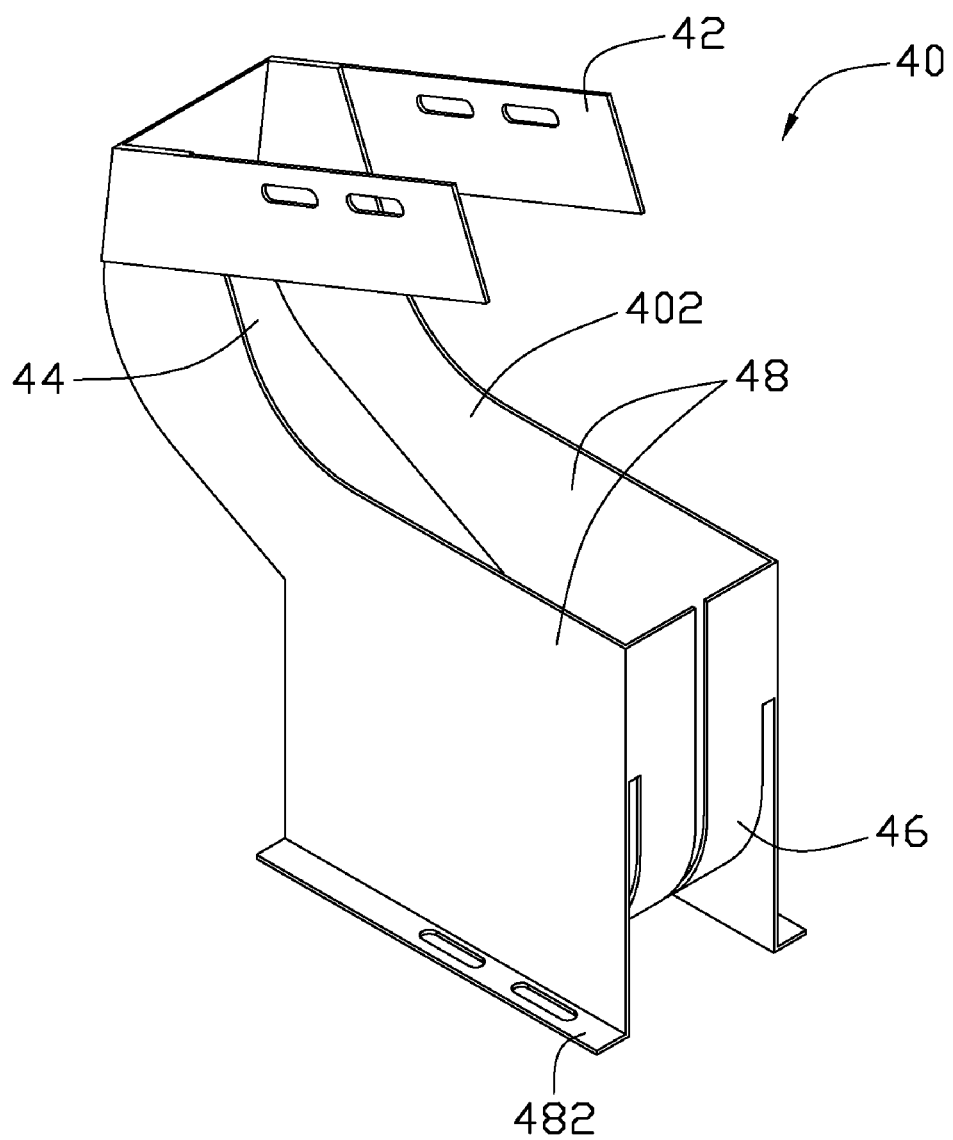
FIG. 2 is an isometric view of a flipping member of the flipping apparatus of FIG. 1.

Referring also to FIG. 2, the flipping member 40 includes two connecting plates 42, a first flipping plate 44, a second flipping plate 46, and two side rails 48. The connecting plates 42 are formed at opposite sides of the first flipping plate 44 at an end of the first flipping plate 44. The side plates 48 are formed along opposite sides of the first flipping plate 44 and the second flipping plate 46 facing the first flipping plate 44, thus defining a flipping groove 402. The flipping groove 402 substantially perpendicularly communicates with the sliding channel 28, such that a turning is defined at the connecting portion of the flipping member 40 and the slider 20. The first flipping plate 44 has an arched section 442 at a middle section thereof, thus forming a turning in the flipping groove 402. The arched section 442 connects two linear sections 444, 446 with an intersection angle of about 120 degrees, in one particular embodiment. The second flipping plate 46 comprises a substantially arched section. An end section of the first flipping plate 44 is slanted relative to the slider 20. The angle defined by the slider 20 and an end of one of the linear sections 444, 446 opposite to the slider 20 is less than the angle of the slider 20 relative to the horizon. Each side rail 48 has a flange for connecting to the holding table 60.

The holding table 60 is disposed below the flipping member 40 and extends parallel to an extending direction of a free end of the second flipping plate 46. A conveyor belt (not shown) is positioned on the holding table 60 to transport the work pieces 80 to a following work process.

Figure 4:
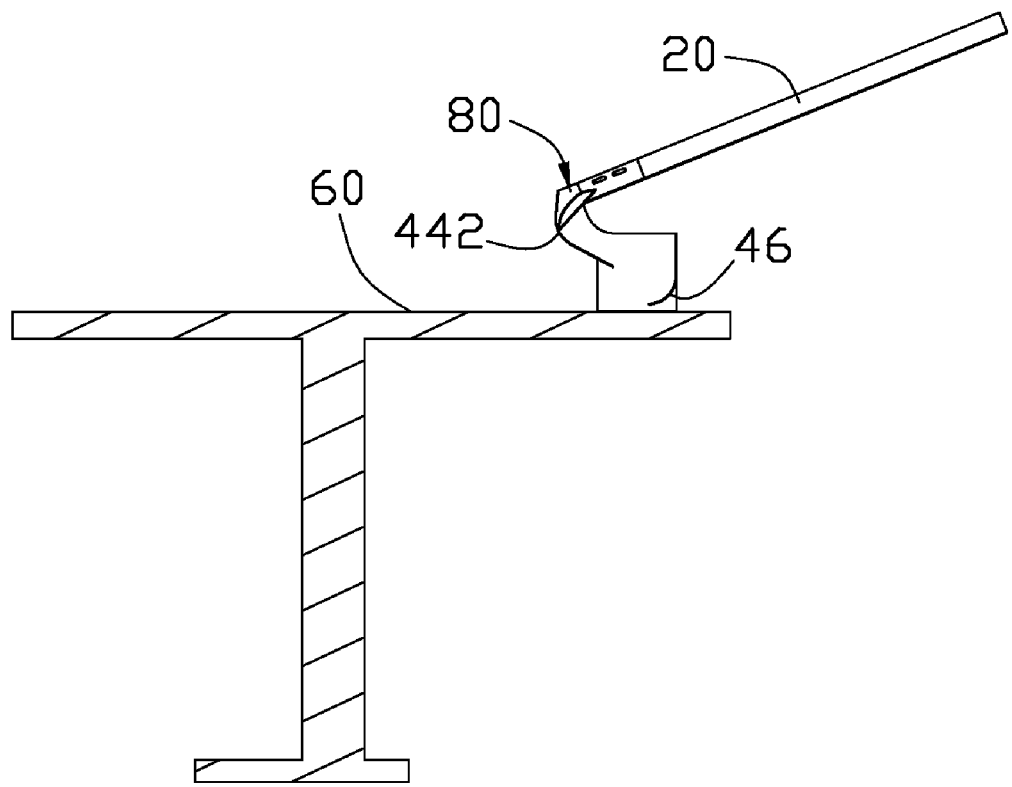
FIG. 4 is a cross-sectional view showing a work piece at a second position of the flipping apparatus of FIG. 1.
Figure 5:
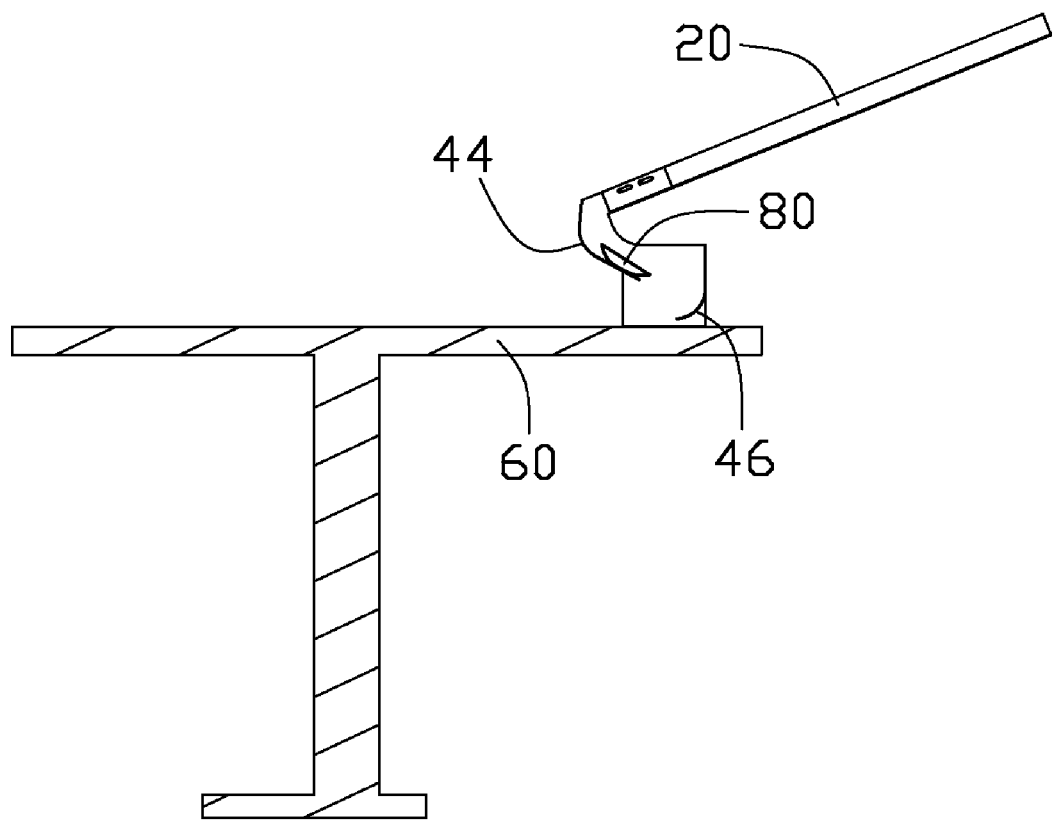
FIG. 5 is a cross-sectional view showing a work piece at a third position of the flipping apparatus of FIG. 1.
Figure 6:
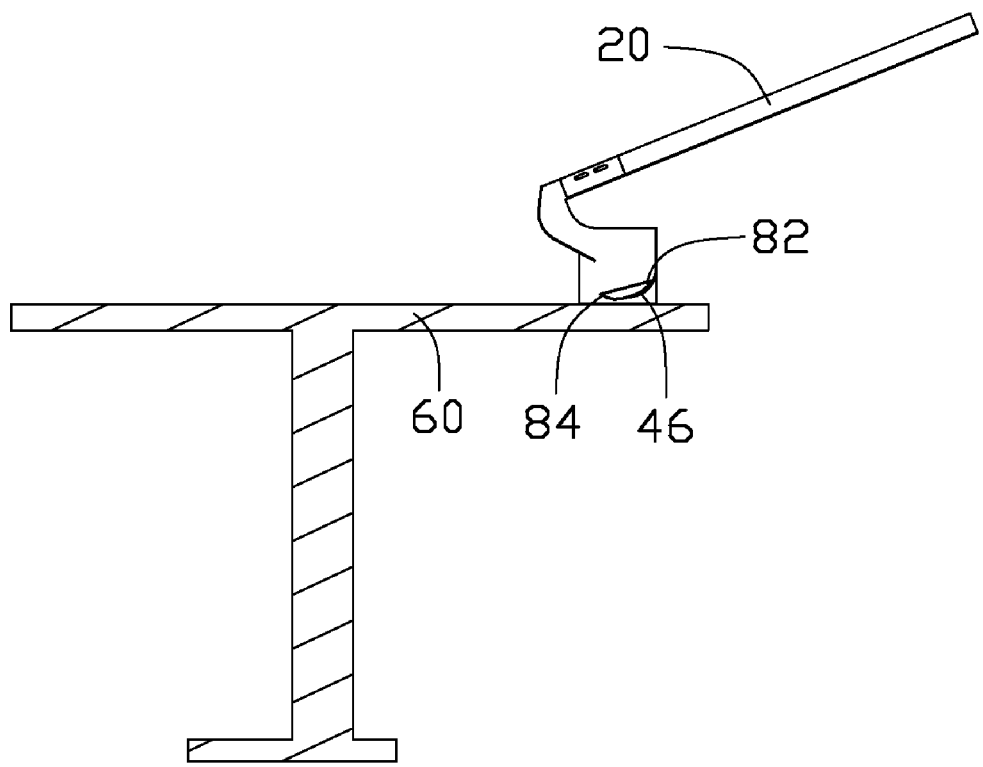
FIG. 6 is a cross-sectional view showing a work piece at a fourth position of the flipping apparatus of FIG. 1.
Figure 7:
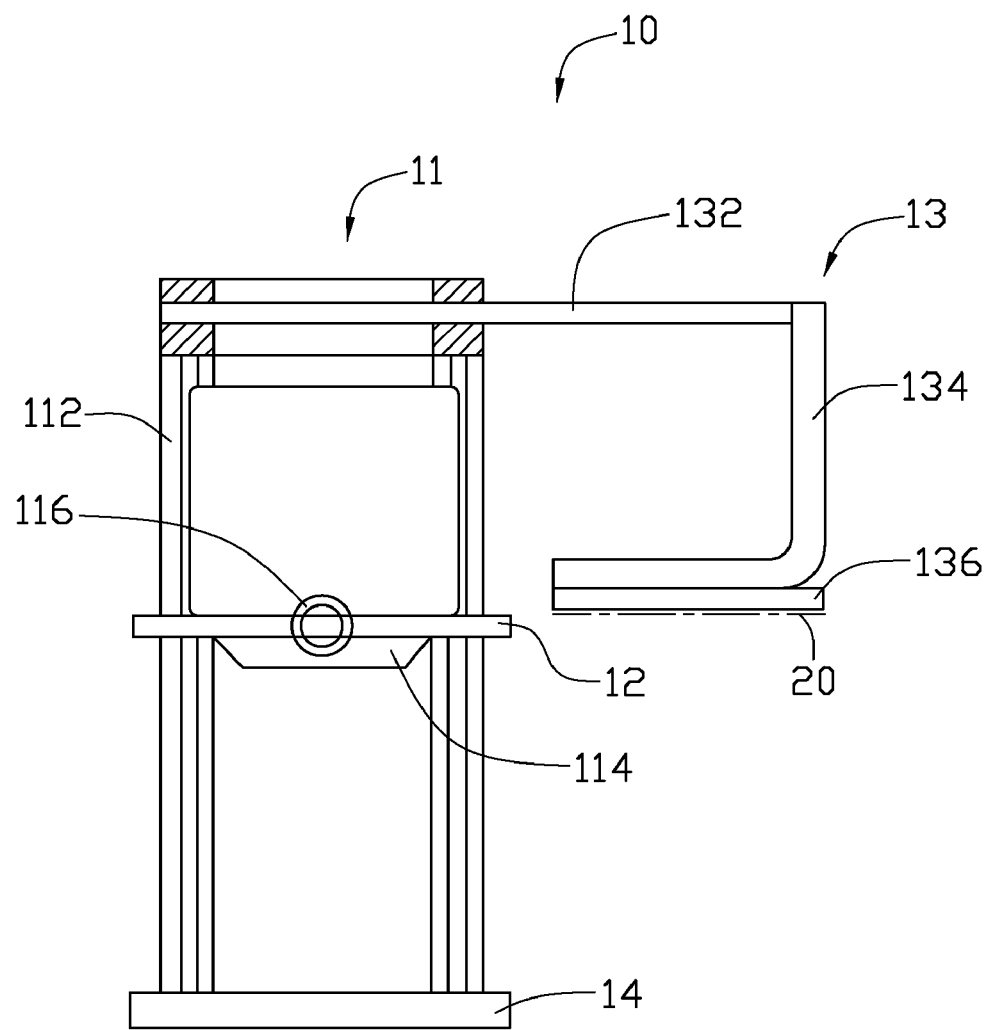
FIG. 7 is a plane view of a flipping apparatus.

A processing of flipping the work piece 80 is described as follows. Firstly, referring to FIG. 3, a work piece 80 is placed at the entrance end 25 of the slider 20. The work piece 80 is usually transferred to the entrance 25 from a previous procedure via a machine/conveyor belt. Then the work piece 80 slides down and accelerates down the sliding channel 28. When the work piece 80 slides down the slider 20, the bottom surface 84 of the work piece 80 faces the main plate 22. Referring to FIG. 4, when the work piece 80 reaches the exit end 26 of the slider 20, the work piece 80 rotates (flips) an angle of about 90 degrees and slides into the flipping groove 402. Thus, the top surface 82 of the work piece 80 now faces the first flipping plate 44. Referring to FIG. 5, when the work piece 80 passes through the arched section 442, a rotation angle of the work piece 80 increases, i.e., the work piece 80 rotates (flips) further. Referring to FIG. 6, the work piece 80 then slides into the second flipping plate 46 from the first flipping plate 44. When the work piece 80 slides into the second flipping plate 46, it is rotated a further 90 degrees by the first flipping plate 44, thus the work piece 80 would have flipped a total of about 180 degrees. Finally, the work piece 80 slides on the horizontally mounted conveyor belt to be conveyed to the following work process.

The flipping apparatus 100 can automatically (overturn) the work piece 80. The flipping apparatus 100 is very simple and has few components, thus having a low cost. In addition, the flipping apparatus 100 has a high reliability.

In alternative embodiments, the intersection angle between the two linear sections 444, 446 connected by the arched section 442 may be changed. For example, the intersection angle may be in the range from about 90 degrees to about 150 degrees. An intersection angle between the flipping groove 402 and the sliding channel 28 may be changed, for example, 60-120 degrees.

Finally, while various embodiments have been described and illustrated, the invention is not to be construed as being limited thereto. Various modifications can be made to the embodiments by those of ordinary skill in the art without departing from the true spirit and scope of the present disclosure as defined by the appended claims.

What is claimed is:

1. A flipping apparatus, comprising:
    a slider;
    a flipping member, a first end of the flipping member is connected to the slider, the flipping member comprising a first flipping plate and a second flipping plate facing the first flipping plate; the first flipping plate and the second flipping plate are contoured to define a workplace groove to receive a workpiece to be flipped, wherein the first flipping plate comprises an arched section and two linear sections connected to opposite ends of the arched section, one of the two linear sections adjacent to the slider is slanted to the slider; and
    a holding table connected to a second end of the flipping member, wherein the second end is opposite to that of the first end of the flipping member.

2. The flipping apparatus as claimed in claim 1, wherein the arched section is located at a middle section of the first flipping plate, and the second flipping plate comprises a substantially arched section.

3. The flipping apparatus as claimed in claim 2, wherein the arched section of the first flipping plate connects two linear sections with an intersection angle of a range from about 90 degrees to about 150 degrees.

4. The flipping apparatus as claimed in claim 2, wherein the arched section of the first flipping plate connects the linear sections with an intersection angle of about 120 degrees.

5. The flipping apparatus as claimed in claim 2, wherein the flipping member further comprises two connecting plates formed at opposite sides of the first flipping plate at one end of the first flipping plate.

6. The flipping apparatus as claimed in claim 5, wherein the flipping member further comprises two side plates, the side plates formed along opposite sides of the first flipping plate for forming the flipping groove.

7. The flipping apparatus as claimed in claim 1, wherein the slider comprises a main plate and two side plates formed at opposite sides of the main plate, and the main plate and the side plates cooperatively form a sliding channel.

8. The flipping apparatus as claimed in claim 7, wherein the slider has an entrance end and an exit end opposite to the entrance end, and a width of the sliding channel is larger than the width of other sections of the sliding channel, thus forming a Y-shaped open at the entrance end.

9. The flipping apparatus as claimed in claim 1, wherein the holding table is disposed below the flipping member and extends parallel to an extending direction of a free end of the second flipping plate.

* * * * *